US012607891B2

(12) United States Patent
Murata et al.

(10) Patent No.: US 12,607,891 B2
(45) Date of Patent: Apr. 21, 2026

(54) OPTICAL DEVICE

(71) Applicant: Murata Manufacturing Co., Ltd., Nagaokakyo (JP)

(72) Inventors: Keiji Murata, Nagaokakyo (JP); Futoshi Ishii, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 738 days.

(21) Appl. No.: 17/392,525

(22) Filed: Aug. 3, 2021

(65) Prior Publication Data

US 2021/0364864 A1 Nov. 25, 2021

Related U.S. Application Data

(63) Continuation of application No. PCT/JP2019/037745, filed on Sep. 26, 2019.

(30) Foreign Application Priority Data

Mar. 19, 2019 (JP) ................................. 2019-050816

(51) Int. Cl.
*G02F 1/13363* (2006.01)
*G02B 5/30* (2006.01)
(Continued)

(52) U.S. Cl.
CPC ..... *G02F 1/133638* (2021.01); *G02B 5/3083* (2013.01); *G02B 27/0927* (2013.01);
(Continued)

(58) Field of Classification Search
CPC ........................... G02B 5/3083; G02B 27/0927
See application file for complete search history.

(56) References Cited

U.S. PATENT DOCUMENTS 3,438,692 A * 4/1969 Tabor ................... G02B 5/3083
359/489.09
4,575,193 A * 3/1986 Greivenkamp, Jr. ........................
G02B 5/3083
348/E9.003
(Continued)

FOREIGN PATENT DOCUMENTS

DE 102012004312 A1 8/2013
EP 2965852 A1 1/2016
(Continued)

OTHER PUBLICATIONS

Merriam-Webster, "Rotatable", https://www.merriam-webster.com/dictionary/rotatable (Year: 2024).*
(Continued)

*Primary Examiner* — Christopher Stanford
(74) *Attorney, Agent, or Firm* — ArentFox Schiff LLP

(57) ABSTRACT

An optical device is provided that includes a first optical member made of a birefringent material and disposed so that an optical axis of the first optical member is neither parallel nor orthogonal to a direction in which incident light travels. Moreover, a second optical member made of a birefringent material is disposed so that an optical axis of the second optical member is neither parallel nor orthogonal to the direction in which the incident light travels. A third optical member is disposed between the first and second optical members and generates an optical path difference of $\{\frac{1}{4}+m\times(\frac{1}{2})\}\times\lambda$ (m is an integer) between orthogonal polarization components of light emitted from the first optical member. At least one of the optical members is rotatable about an axis of the incident light.

18 Claims, 12 Drawing Sheets

(51) Int. Cl.
    *G02B 27/09*         (2006.01)
    *B23K 26/064*       (2014.01)

(52) U.S. Cl.
    CPC ........ *B23K 26/064* (2015.10); *G02F 2202/40*
                (2013.01); *G02F 2413/02* (2013.01)

(56) References Cited

U.S. PATENT DOCUMENTS

| | | | | |
|---|---|---|---|---|
| 9,759,924 B2 * | 9/2017 | Johnson | ............. | G02B 27/0905 |
| 2006/0256335 A1 | 11/2006 | Chen | | |
| 2018/0345419 A1 | 12/2018 | Mikutis | | |

FOREIGN PATENT DOCUMENTS

| | | | | |
|---|---|---|---|---|
| JP | S61198210 A | | 9/1986 |
| JP | H0489192 A | | 3/1992 |
| JP | 2013217971 A | * | 10/2013 |
| JP | 2015123483 A | | 7/2015 |
| JP | 2018535912 A | | 12/2018 |

OTHER PUBLICATIONS

International Search Report issued for PCT/JP2019/037745, date of mailing Nov. 26, 2019.

\* cited by examiner

ANGLE $\alpha$ (deg)

0-0.1   0.1-0.2   0.2-0.3   0.3-0.4

OPTICAL DEVICE

CROSS REFERENCE TO RELATED APPLICATIONS

The present application is a continuation of PCT/JP2019/037745 filed Sep. 26, 2019, which claims priority to Japanese Patent Application No. 2019-050816, filed Mar. 19, 2019, the entire contents of each of which are incorporated herein by reference.

TECHNICAL FIELD

The present invention relates to an optical device.

BACKGROUND ART

When, for example, a laser processing machine outputs a laser beam having a Gaussian-shaped profile, the power of the laser beam differs between a central region and a peripheral region of an irradiation area. Therefore, there may be a problem that an object irradiated with the laser beam will be damaged in a region where the power of the laser beam is high or that the object cannot be sufficiently processed in a region where the power of the laser beam is low. To solve such a problem, a beam-shaping element has been used to shape the profile of an output laser beam from a light source as desired in accordance with the use. For example, Japanese Unexamined Patent Application Publication No. 61-198210 (hereinafter "Patent Document 1") discloses an optical device for laser processing including two birefringent crystals and a half wave plate disposed between the birefringent crystals. This optical device for laser processing divides a Gaussian-shaped laser beam into four laser beams by causing birefringence twice, so that a region in which the laser-beam intensity distribution is uniform can be increased.

When the power of the laser beam generated by a light source is increased, the profile of the laser beam may deviate from an even Gaussian shape and become asymmetric due to, for example, mixture of high-order modes. When such a laser beam is shaped by the optical device for laser processing disclosed in Patent Document 1, it is difficult to obtain a uniform profile because the original laser beam is asymmetric.

SUMMARY OF THE INVENTION

Accordingly, the present disclosure has been made in light of the above-described circumstances. Thus, it is an object of the present disclosure is to provide an optical device constructed for adjusting a mode of shaping the profile of incident light.

Thus, an optical device is provided according to an exemplary aspect that includes a first optical member made of a birefringent material and disposed so that an optical axis of the first optical member is neither parallel nor orthogonal to a direction in which incident light travels; a second optical member made of a birefringent material and disposed so that an optical axis of the second optical member is neither parallel nor orthogonal to the direction in which the incident light travels; and a third optical member disposed between the first and second optical members. Moreover, the third optical member generates an optical path difference of $\{\frac{1}{4}+m\times(\frac{1}{2})\}\times\lambda$ (m is an integer) between orthogonal polarization components of light emitted from the first optical member. In an exemplary aspect, at least one of the first optical member, the second optical member, and the third optical member is rotatable about an axis of the incident light.

The exemplary embodiment of the present disclosure provides an optical device constructed for adjusting a mode of shaping the profile of incident light.

DETAILED DESCRIPTION OF EMBODIMENTS

Exemplary embodiments of the present invention will now be described. In the following description of the drawings, the same or similar components are denoted by the same or similar reference signs. The drawings are illustrative, and schematically show the dimensions and shape of each part. It is to be understood that the technical scope of the present invention is not limited to the embodiments.

Figure 1:
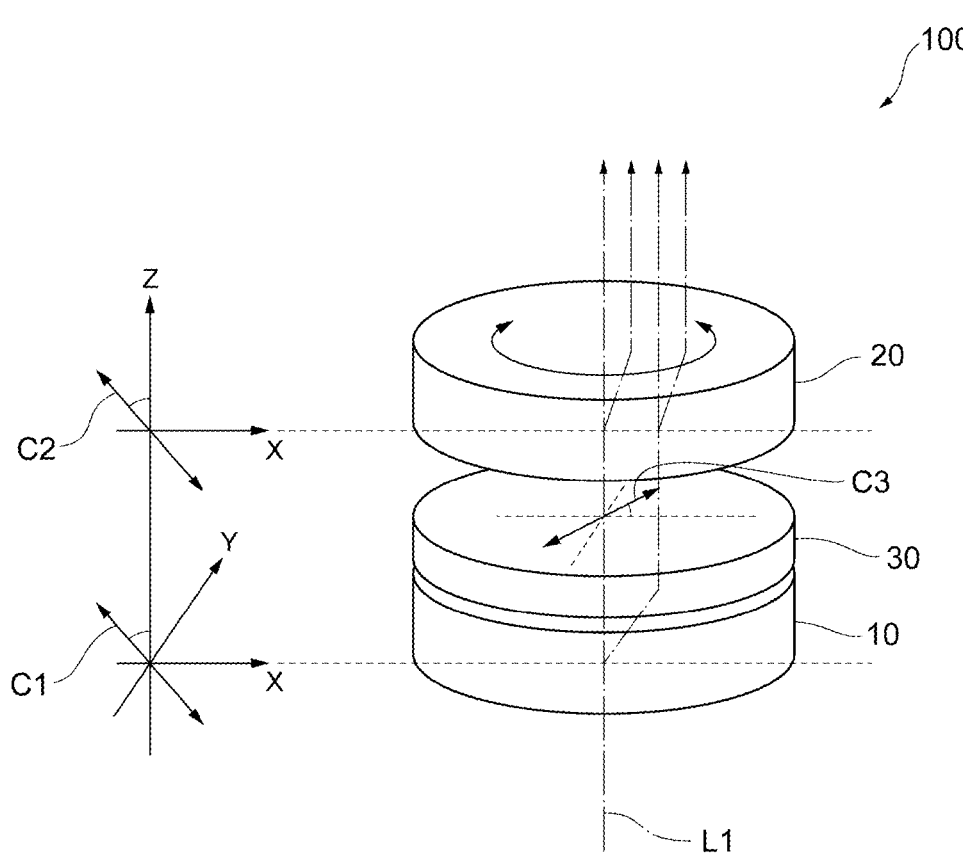
FIG. 1 is a perspective view illustrating an exemplary structure of an optical device according to a first exemplary embodiment of the present disclosure.

An optical device according to a first exemplary embodiment of the present disclosure will be described with reference to FIG. 1. FIG. 1 is a perspective view illustrating an exemplary structure of the optical device according to the first embodiment.

According to an exemplary aspect, an optical device 100 is included in, for example, a laser processing machine that processes an object by using a laser beam, and functions as a beam-shaping element for shaping the profile of a laser beam generated by a light source.

As illustrated in FIG. 1, the optical device 100 includes, for example, a first optical member 10, a second optical member 20, and a quarter wave plate 30. For convenience of description, the members will be described by using rectangular coordinate systems with X, Y, and Z axes that are orthogonal to each other, as illustrated in FIG. 1. However, these coordinate systems are not related to the crystal axes of the members.

The first optical member 10, the quarter wave plate 30, and the second optical member 20 are arranged in that order along an optical path of a laser beam L1 emitted from a light source (not illustrated). In the present embodiment, the first optical member 10, the quarter wave plate 30, and the second optical member 20 have the shapes of flat circular plates of substantially the same size in plan view when viewed in the direction of the Z axis, and each have two principal surfaces that are parallel to a plane defined by the X and Y axes (this plane is hereinafter referred to also as an XY plane, and other planes are similarly defined) and a thickness in a direction parallel to the Z axis. The laser beam L1 travels in a direction parallel to the Z axis from the negative side to the positive side of the Z axis, and passes through the first optical member 10, the quarter wave plate 30, and the second optical member 20 in that order. It should be appreciated that the laser beam L1 may travel in a direction opposite to the above-described direction.

It is noted that the materials of the first optical member 10, the second optical member 20, and the quarter wave plate 30 are not particularly limited as long as the materials are birefringent. For example, the first optical member 10, the second optical member 20, and the quarter wave plate 30 may be made of a crystalline material, such as quartz, rutile, or sapphire, or a birefringent resin. In the present embodiment, for example, all of the first optical member 10, the second optical member 20, and the quarter wave plate 30 are made of synthetic quartz. Synthetic quartz is a uniaxial crystal having an optical axis in one direction, and is birefringent. Synthetic quartz has a high transmittance over a broader wavelength range compared to other materials, such as glass. Moreover, synthetic quartz has optical characteristics that are not easily degraded and deteriorates slowly even when high-energy light with a relatively short wavelength (for example, deep ultraviolet light) passes therethrough. In addition, synthetic quartz is not deliquescent, and is therefore highly resistant to moisture.

Figure 2:
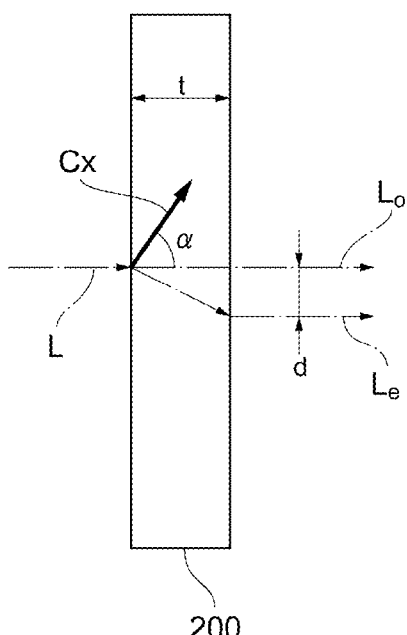
FIG. 2 illustrates birefringence in a uniaxial crystal.

FIG. 2 illustrates birefringence in a uniaxial crystal. The uniaxial crystal 200 has an optical axis Cx in one direction. When a direction in which incident light L incident on the uniaxial crystal 200 travels is neither parallel nor orthogonal to the optical axis Cx of the uniaxial crystal 200, the incident light L incident on the uniaxial crystal 200 is divided into an ordinary ray $L_o$ and an extraordinary ray $L_e$ having vibration planes that are orthogonal to each other. Thus, so-called birefringence occurs because the optical member has a crystal structure such that light rays travel therethrough at different phase velocities depending on the travelling direction and therefore the refractive index differs depending on the vibration plane.

Assume that the thickness of the uniaxial crystal 200 is t, the refractive index for the ordinary ray $L_o$ is $n_o$, the refractive index for the extraordinary ray $L_e$ is $n_e$, and the angle between the optical axis Cx of the uniaxial crystal 200 and the incident light L is $\alpha$. A separation width d between the ordinary ray $L_o$ and the extraordinary ray $L_e$ is obtained as in Equation (1) as follows:

$$d = t\frac{(n_e^2 - n_o^2)\sin\alpha\cos\alpha}{(n_o\sin\alpha)^2 + (n_e\cos\alpha)^2} \tag{1}$$

Figure 3:
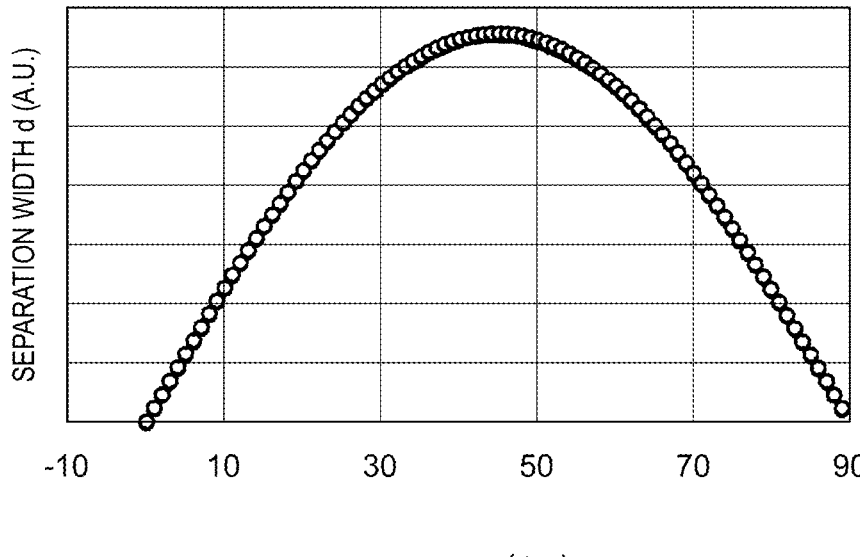
FIG. 3 is a graph showing the relationship between the angle between an optical axis of the uniaxial crystal and incident light and the separation width between an ordinary ray and an extraordinary ray.

FIG. 3 is a graph showing the relationship between the angle between the optical axis of the uniaxial crystal and the incident light and the separation width between the ordinary ray and the extraordinary ray. The horizontal axis of the graph represents the angle $\alpha$ (deg) between the optical axis and the incident light, and the vertical axis of the graph represents the separation width d between the ordinary ray and the extraordinary ray. The graph of FIG. 3, which shows the relationship between the angle $\alpha$ between the optical axis and the incident light and the separation width d between the ordinary ray and the extraordinary ray, is obtained based on Equation (1). The graph shows that the separation width d is at a maximum when the angle $\alpha$ is about 45 degrees. In other words, a relatively large separation width d can be obtained even when the thickness t of the uniaxial crystal is relatively small. The graph also shows that the amount of variation in the separation width d relative to the amount of variation in a is small when the angle $\alpha$ is in the range of about 35 degrees to about 55 degrees.

Referring back to FIG. 1, an optical axis C1 of the first optical member 10 and an optical axis C2 of the second optical member 20 are both on an XZ plane, and are arranged to be neither parallel nor orthogonal to the direction in which the incident light travels. The angle between the optical axis C1 and the incident light and the angle between the optical axis C2 and the incident light can both be in the range of, for example, about 35 degrees to about 55 degrees based on FIG. 3 described above. The angle between each optical axis and the incident light is defined as the smaller one of angles defined by the optical axis and the direction in which the incident light travels.

At least one of the first optical member 10, the second optical member 20, and the quarter wave plate 30 is configured to be rotatable along an XY plane about an axis of the incident light incident on each member. When, for example, the second optical member 20 is rotatable, the direction of inclination of the optical axis C2 of the second optical member 20 relative to the incident light can be adjusted as appropriate. The effects of the adjustment of the inclination direction will be described below.

Moreover, the quarter wave plate 30 is disposed on the optical path of the laser beam L1 and between the first optical member 10 and the second optical member 20. The quarter wave plate 30 can have a thickness less than the thicknesses of the first optical member 10 and the second optical member 20. The quarter wave plate 30 has an optical axis C3 disposed on an XY plane such that the angle between the optical axis C3 and the X axis is acute. In other words, the optical axis C3 of the quarter wave plate 30 is orthogonal to the direction in which the incident light travels. The angle between the optical axis C3 of the wave plate 30 and the X axis may be, for example, about 45 degrees.

The quarter wave plate 30 causes light to pass therethrough at different speeds depending on the vibration plane of the light, and thereby generates an optical path difference of $\{\frac{1}{4}+(\frac{1}{2})\times m\}\times\lambda$ (where m is an integer) between polarization components that are orthogonal to each other. Here, $\lambda$ is the wavelength of light. Thus, the quarter wave plate 30 has a function of converting, for example, linearly polarized light into circularly or elliptically polarized light and circularly or elliptically polarized light into linearly polarized light. This function will be further described with reference to FIGS. 4A and 4B.

Figure 4A:
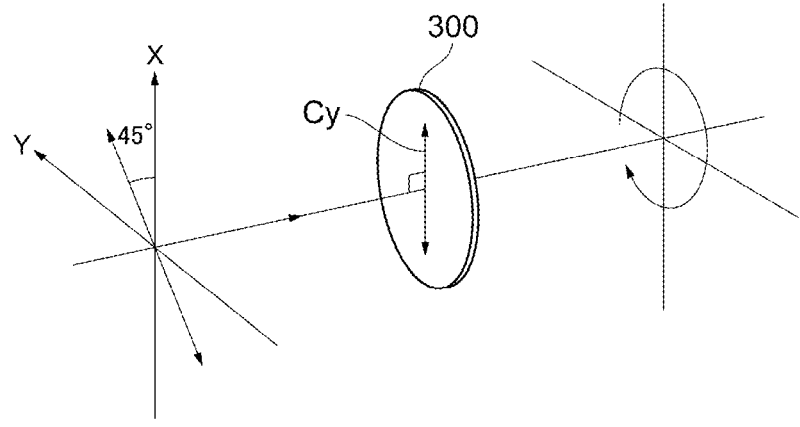
FIG. 4A illustrates the principle of a quarter wave plate.
Figure 4B:
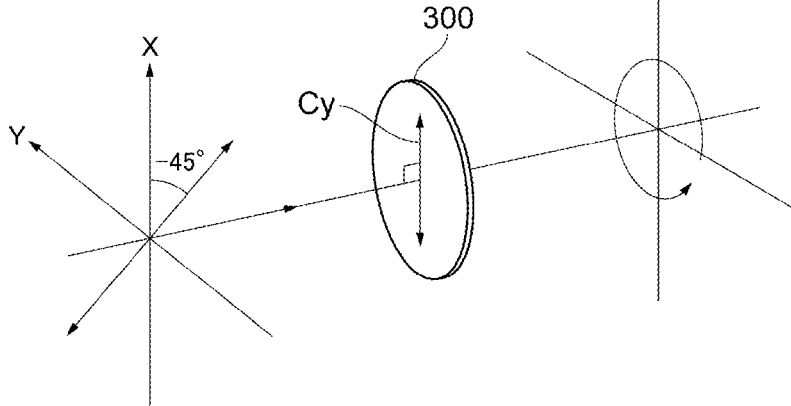
FIG. 4B illustrates the principle of the quarter wave plate.

FIGS. 4A and 4B illustrate the principle of a quarter wave plate. FIGS. 4A and 4B illustrate a state in which linearly polarized light is incident on a quarter wave plate 300. The quarter wave plate 300 has an optical axis Cy that is orthogonal to the direction in which the incident light travels.

FIG. 4A illustrates a state in which the polarization direction of light is inclined 45 degrees toward the positive side of the Y axis with respect to the optical axis Cy of the quarter wave plate 300. Due to the anisotropy of the quarter wave plate 300, an X component and a Y component of the linearly polarized incident light are emitted with a phase shift of 90 degrees therebetween. Therefore, the linearly polarized light is emitted as circularly polarized light that is polarized clockwise when viewed from the quarter wave plate 300. FIG. 4B illustrates a state in which the polarization direction of light is inclined 45 degrees toward the negative side of the Y axis with respect to the optical axis Cy of the quarter wave plate 300. In this case, the linearly polarized light is emitted as circularly polarized light that is polarized counterclockwise when viewed from the quarter wave plate 300. Thus, linearly polarized light components having vibration planes that are orthogonal to each other are converted into circularly polarized light components that are polarized in opposite directions by the quarter wave plate. The conversion between linearly polarized light and circularly polarized light also occurs in the reverse direction. When the incident light and the emitted light are reversed in FIGS. 4A and 4B, circularly polarized light is converted into linearly polarized light.

Figure 5A:
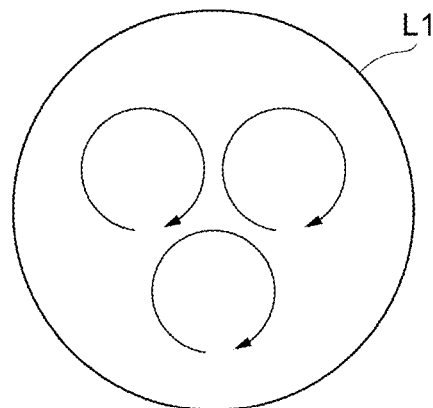
FIG. 5A is a schematic diagram illustrating a laser beam incident on a first optical member illustrated in FIG. 1.
Figure 5B:
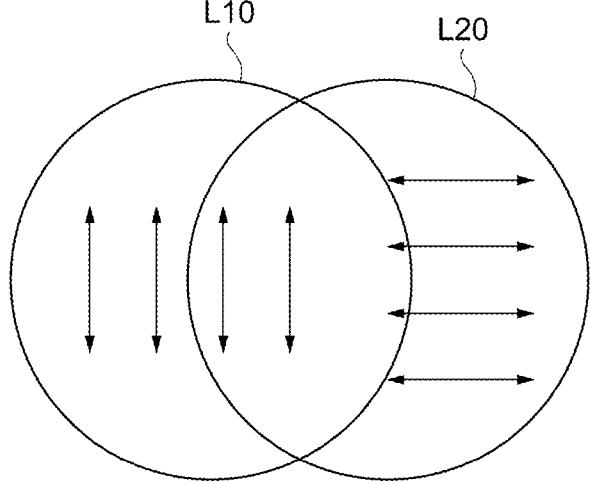
FIG. 5B is a schematic diagram illustrating laser beams emitted from the first optical member illustrated in FIG. 1.
Figure 5C:
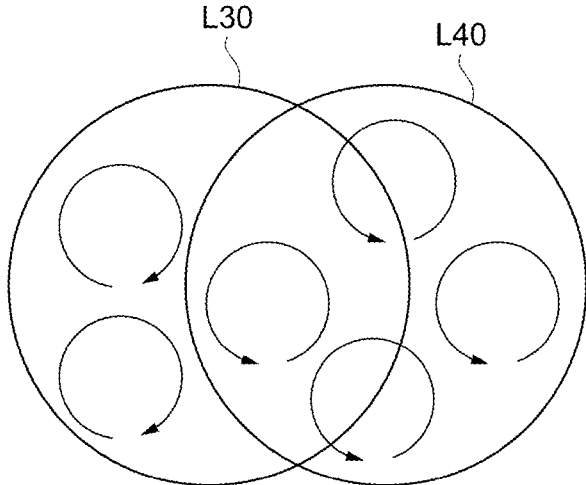
FIG. 5C is a schematic diagram illustrating laser beams emitted from a quarter wave plate illustrated in FIG. 1.
Figure 5D:
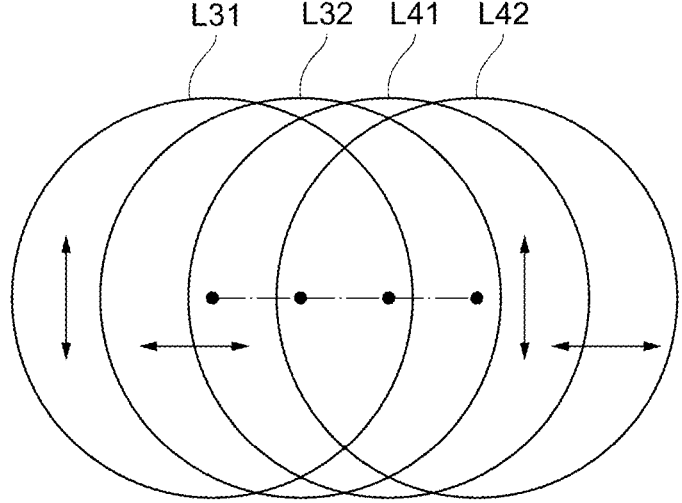
FIG. 5D is a schematic diagram illustrating laser beams emitted from a second optical member illustrated in FIG. 1.

An operation of the optical device 100 that shapes the profile of a laser beam based on the above-described principle will now be described with reference to FIG. 1 and FIGS. 5A to 5D. FIG. 5A is a schematic diagram illustrating a laser beam incident on the first optical member illustrated in FIG. 1. FIG. 5B is a schematic diagram illustrating laser beams emitted from the first optical member illustrated in FIG. 1. FIG. 5C is a schematic diagram illustrating laser beams emitted from the quarter wave plate illustrated in FIG. 1. FIG. 5D is a schematic diagram illustrating laser beams emitted from the second optical member illustrated in FIG. 1. For convenience of description, it is assumed that the laser beam L1 to be incident on the first optical member 10 is circularly polarized light having a perfectly circular shape in cross section. However, the polarization, cross-sectional shape, and profile of the laser beam are not particularly limited. For example, the laser beam may instead be natural light or elliptically polarized light in an exemplary aspect. Moreover, the laser beam may instead have an elliptical shape or a polygonal shape in cross section in an exemplary aspect. In FIGS. 5A to 5D, the polarization directions are shown by arrows.

As illustrated in FIG. 5A, the laser beam L1 to be incident on the first optical member 10 is circularly polarized light in which the vibration plane of the electric field rotates in a certain direction. As described above, the optical axis C1 of the first optical member 10 is disposed to be neither parallel nor orthogonal to the direction in which the incident light travels. Accordingly, the light that passes through the first optical member 10 is divided into and output as two separate laser beams due to birefringence (see FIG. 1). Moreover, the two separate laser beams, which are a laser beam L10 and a laser beam L20, are linearly polarized light beams having vibration planes that are orthogonal to each other (see FIG. 5B). For convenience of description, it is assumed that the vibration planes of the laser beam L10 and the laser beam L20 are parallel to the X axis and the Y axis in FIG. 1.

The two separates laser beams L10 and L20 pass through the quarter wave plate 30. The optical axis C3 of the quarter wave plate 30 is disposed such that the optical axis C3 is orthogonal to the direction in which the laser beams L10 and L20 emitted from the first optical member 10 travel and such that the angle between the optical axis C3 and each of the vibration planes of the laser beams L10 and L20 is 45 degrees. In other words, the relationships between the quarter wave plate 30 and the laser beams L10 and L20 correspond to those illustrated in FIGS. 4A and 4B. Therefore, the two laser beams L10 and L20 that pass through the quarter wave plate 30 are converted into and output as laser beams L30 and L40 that are circularly polarized in opposite directions as shown in FIG. 5C.

The circularly polarized laser beams L30 and L40 are incident on the second optical member 20. Similar to the first optical member 10, the optical axis C2 of the second optical member 20 is disposed to be neither parallel nor orthogonal to the direction in which the incident light travels. Accordingly, the laser beams L30 and L40 that pass through the second optical member 20 are each divided into and output as two separate laser beams due to birefringence. The separate laser beams, which are two laser beams L31 and L32 and two laser beams L41 and L42, are linearly polarized light beams having vibration planes that are orthogonal to each other as shown in FIG. 5D. The second optical member 20 emits the four laser beams L31, L32, L41, and L42, which are separated from each other and linearly distributed in the X-axis direction. These four laser beams L31, L32, L41, and L42 are superimposed and together form a profile of light emitted from the optical device 100.

When the optical axis C1 of the first optical member 10 and the optical axis C2 of the second optical member 20 are disposed to extend in the same direction as described above, the four laser beams L31, L32, L41, and L42 are linearly distributed as illustrated in FIG. 5D. When these four laser beams are superimposed, the emitted light has an elliptical cross section elongated in one direction. When an object is subjected to laser processing, cracks are easily formed in the object in a major-axis direction of the cross-sectional shape of irradiation light. Therefore, the above-described profile is effective when, for example, the direction of the cracks is to be controlled.

Figure 6:
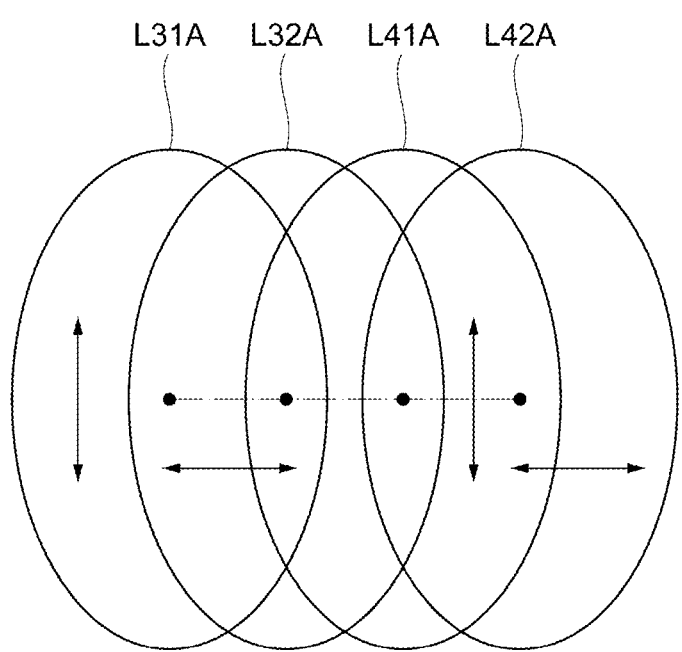
FIG. 6 is a schematic diagram illustrating another example of laser beams emitted from the second optical member illustrated in FIG. 1.

FIG. 6 is a schematic diagram illustrating another example of laser beams emitted from the second optical member illustrated in FIG. 1. When, for example, a laser beam incident on the first optical member 10 has an elliptical shape in cross section, the optical device 100 may be configured to distribute four laser beams L31A, L32A, L41A, and L42A in a minor-axis axial direction of the elliptical shape. In such a case, as illustrated in FIG. 6, the emitted light may be shaped so that the overall cross-sectional shape is closer to a perfect circle.

Rotations of the first optical member 10 and the second optical member 20 along an XY plane will now be described.

Figure 7:
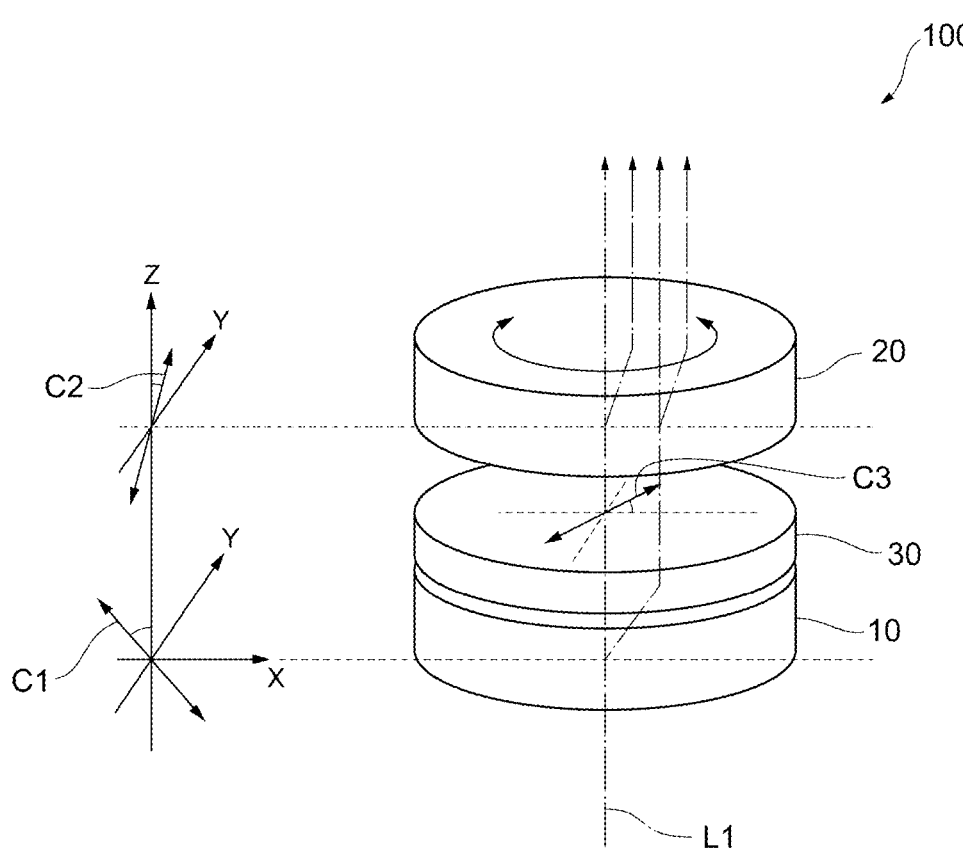
FIG. 7 is a perspective view illustrating a structural example in which the second optical member illustrated in FIG. 1 is rotated.
Figure 8A:
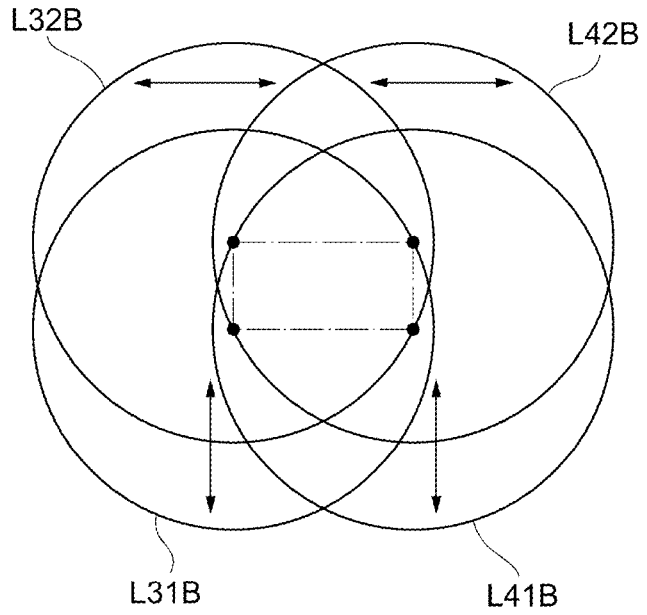
FIG. 8A is a schematic diagram illustrating laser beams emitted from the second optical member illustrated in FIG. 1 when the second optical member is rotated.
Figure 8B:
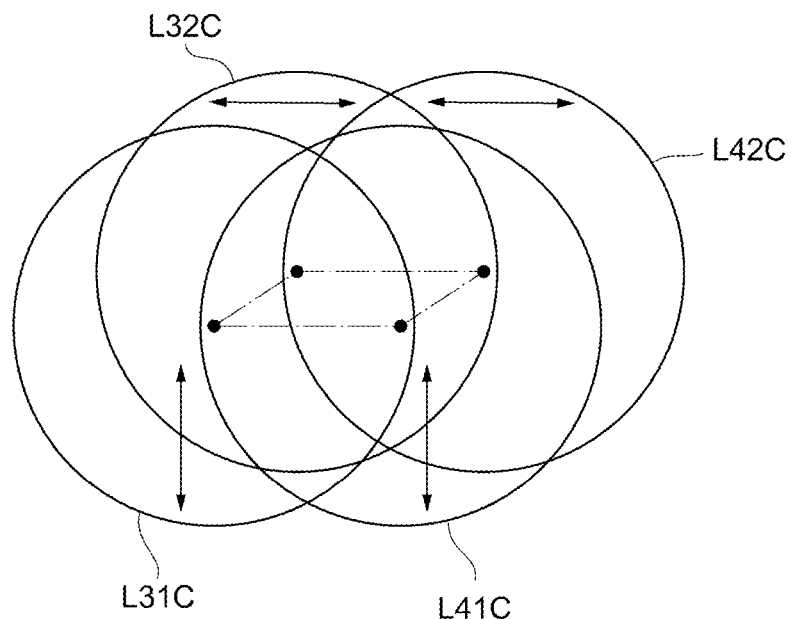
FIG. 8B is a schematic diagram illustrating laser beams emitted from the second optical member illustrated in FIG. 1 when the second optical member is rotated.

FIG. 7 is a perspective view illustrating a structural example in which the second optical member illustrated in FIG. 1 is rotated. FIG. 8A and FIG. 8B are schematic diagrams illustrating laser beams emitted from the second optical member illustrated in FIG. 1 when the second optical member is rotated.

FIG. 7 illustrates a structure in which the second optical member 20 illustrated in FIG. 1 is rotated 90 degrees about the axis of the incident light in the direction from the Y axis toward the X axis. More specifically, in FIG. 7, the optical axis C2 of the second optical member 20 is disposed on a YZ plane such that the angle between the optical axis C2 and the Z axis is acute. In this case, the laser beam L1 incident on the first optical member 10 is divided into two separate laser beams in the X-axis direction when the laser beam L1 passes through the first optical member 10. The two separate laser beams, which are linearly polarized laser beams, pass through the quarter wave plate 30, and are thereby converted into circularly polarized laser beams as described above. The two circularly polarized laser beams pass through the second optical member 20, so that each of the light beams is divided into two separate laser beams in the Y-axis direction, that is, in a direction different from that in the first optical member 10. Therefore, the light emitted from the second optical member 20 spreads in both the X-axis direction and the Y-axis direction, as illustrated in FIG. 8A. In other words, the centers of four laser beams L31B, L32B, L41B, and L42B form a rectangle. Thus, a laser beam having a Gaussian-shaped profile, for example, can be divided into four light beams which together form a so-called top-hat-shaped profile. As known in the related art, such a profile is effective in performing uniform and even laser processing.

It is noted that the angle by which the second optical member 20 is rotated can be adjusted to place the optical axis C2 of the second optical member 20 between an XZ plane and a YZ plane so that, as illustrated in FIG. 8B, the centers of four laser beams L31C, L32C, L41C, and L42C form a parallelogram.

When, for example, the profile of the laser beam input to the optical device 100 is not Gaussian-shaped and is asymmetric, the four light beams may be intentionally unevenly separated from each other so as to correct the asymmetry. Thus, according to the optical device 100, since the first optical member 10 and the second optical member 20 can be rotated, the directions in which the four light beams are separated can be adjusted in accordance with the profile of the incident light or the use of the shaped laser beams.

More specifically, for example, in the structure disclosed in Patent Document 1, the half wave plate is disposed between the two birefringent materials. In this case, two light beams separated by the first birefringent material are incident on the second birefringent material without having their polarization converted from linear polarization. Therefore, there are limitations regarding the arrangement of optical axes of the birefringent materials. When, for example, the power of the laser beam generated by a light source is increased, the profile of the laser beam may deviate from an even Gaussian shape and become asymmetric due to, for example, mixture of high-order modes. In the case where such a laser beam is applied to the optical device for laser processing disclosed in Patent Document 1, it is difficult to obtain a uniform profile because the directions in which light is divided by birefringence are set even when the original laser beam is asymmetric.

In contrast, according to the present embodiment, the quarter wave plate 30 is disposed between the first optical member 10 and the second optical member 20, so that the two linearly polarized laser beams emitted from the first optical member 10 can be converted into, for example, circularly polarized light beams. It is noted that the circularly polarized light beams have no specific plane of polarization, and therefore there are no limitations regarding the plane of polarization when the light beams are incident on the second optical member 20. Accordingly, the directions of the optical axes of the first optical member 10 and the second optical member 20 can be adjusted independently of each other. The mode of shaping the profile of the laser beam can be adjusted by rotating the first optical member 10 and the second optical member 20 about the axis of the incident light in accordance with the profile of the incident laser beam and the use of the laser beam.

A configuration in which a light beam is shaped by using a phase-modulating spatial light modulator (SLM), for example, is based on the assumption that the light beam has a single phase. However, when, for example, the output power of the laser beam is increased, a laser beam having a single phase cannot be obtained due to, for example, noise caused by parasitic oscillation and mixture of high-order modes, and therefore it becomes difficult to achieve beam shaping by using the SLM. In contrast, according to the present embodiment, light can be divided irrespective of the phase. Therefore, compared to the case in which the SLM is used, a laser beam can be more appropriately shaped even when the output power of the laser beam is increased. In addition, although a device such as the SLM has a problem of response time, the optical device 100 according to the present embodiment is passively operated depending on the state of polarization of light, and therefore reliably provides a certain effect. In addition, according to the present embodiment, when the first optical member 10, the second optical member 20, and the quarter wave plate 30 are made of a crystalline material, such as quartz or sapphire, resistance to the laser beam can be increased.

It is reiterated that the materials of the first optical member 10, the second optical member 20, and the quarter wave plate 30 are not limited to synthetic quartz, and may be various birefringent materials. For example, as the difference between the refractive index for the ordinary ray and the refractive index for the extraordinary ray in the first optical member 10 and the second optical member 20 increases, the separation width between the separated laser beams increases, so that the sizes of the first optical member 10 and the second optical member 20 can be reduced. When the quarter wave plate 30 has a large refractive index, the quarter wave plate 30 may be too thin and have poor workability. Therefore, the first optical member 10 and the second optical member 20 can be made of sapphire or rutile, which have refractive indices greater than that of quartz, and the quarter wave plate 30 can be made of quartz.

When materials having different refractive indices are brought into close contact with each other, loss in the amount of light due to reflection or stray light may occur at the interface between the materials. Therefore, the first optical member 10, the second optical member 20, and the quarter wave plate 30 can all be made of the same material. In such a case, the occurrence of loss in the amount of light and stray light can be reduced.

When the separation width between the laser beams separated by the first optical member 10 and the separation width between the laser beams separated by the second optical member 20 are equal, the entireties of two of the separated light beams may overlap. This is not preferable when beams are to be uniformly distributed. When the separation width between the laser beams separated by the first optical member 10 and the separation width between the laser beams separated by the second optical member 20 are excessively different from each other, the effect of one of the optical members with the greater separation width becomes dominant, and the rotation of the optical members does not provide a sufficient adjustment effect. Therefore, the separation widths of the first optical member 10 and the second optical member 20 are preferably such that a greater separation width d1 and a smaller separation width d2 satisfy $(\frac{1}{2})*d1 \leq d2 < d1$. To satisfy this relationship between the separation widths d1 and d2, the first optical member 10 and the second optical member 20 may have different thicknesses. Alternatively, the optical axes C1 and C2 may be at different angles relative to the direction in which the incident light travels.

Any one or more of the first optical member 10, the second optical member 20, and the quarter wave plate 30 can be rotatable. For example, an amplifier that generates a laser beam can have polarization dependence such that mixture of high-order modes occurs for specific polarized light. In such a case, one of the two light beams separated by the first optical member 10 may have an elliptical cross-sectional shape or a bimodal intensity distribution, and the two light beams may have uneven intensities. To reduce such an unevenness and improve the shapes of the profiles, the first optical member 10 and the second optical member 20 can both be rotatable. For example, the second optical member 20 is preferably rotatable at least 180 degrees relative to the first optical member 10. More specifically, for example, the entirety of the optical device 100 may be rotatable at least 180 degrees relative to the incident light, and the second optical member 20 may be rotatable 180 degrees relative to the optical device 100. Alternatively, the first optical member 10 and the second optical member 20 may be independently rotatable such that the first optical member 10 is rotatable at least 180 degrees and that the second optical member 20 is rotatable 360 degrees.

Although the direction in which the laser beams are separated is adjusted in the above-described embodiment, the intensity ratio between the separated light beams may be adjusted instead of or in addition to the direction of separation. More specifically, the intensity ratio between the separated laser beams may be adjusted by rotating the quarter wave plate 30 about an axis of the incident light. For example, when one of the two light beams separated by the first optical member 10 has a large asymmetry, the angle of the optical axis C3 of the quarter wave plate 30 may be adjusted so that the intensity of the light beam having a large asymmetry is less than the intensity of the other light beam.

When the optical axis C3 of the quarter wave plate 30 is not at an angle of 45 degrees relative to either of the vibration planes of the two laser beams that are incident on the quarter wave plate 30 and is neither orthogonal nor parallel to the vibration planes, the linearly polarized laser beams are converted into and output as elliptically polarized laser beams having various ellipticities. When the optical axis C3 of the quarter wave plate 30 is orthogonal to the vibration plane of one of the two laser beams incident on the quarter wave plate 30 and parallel to the vibration plane of the other laser beam, these laser beams are output without having their polarization converted from linear polarization. Thus, by rotating the quarter wave plate 30 to change the angle of the optical axis C3, the intensity ratios between the four laser beams emitted by the second optical member 20 can be intentionally varied, and accordingly, the unevenness between the two laser beams separated by the first optical member 10 can be cancelled.

In the above-described embodiment, the optical device 100 includes two optical members (i.e., the first optical member 10 and the second optical member 20) and one quarter wave plate 30. However, the number of optical members included in the optical device is not limited to this configuration. For example, in alternative aspects, the optical device can include N units (N is an integer of 2 or more) which each include a combination corresponding to the combination of the quarter wave plate 30 and the second optical member 20 behind an optical member corresponding to the first optical member 10. In such a case, a laser beam may be divided into $2N^{+1}$ beams.

In the above-described embodiment, the quarter wave plate 30 is an example of a third optical member disposed between the first optical member 10 and the second optical member 20. However, the third optical member is not limited to a quarter wave plate as long as the third optical member is configured to generate an optical path difference of $\{\frac{1}{4}+(\frac{1}{2})\times m\}\times\lambda$ between polarization components that are orthogonal to each other. The third optical member can be a true-zero-order plate (m=0) or a multiple-order plate (m=1, 2, 3, . . . ). In this specification, the term "optical member" is not limited to a member composed of a single component, and includes a unit including a plurality of components. The third optical member can, for example, include two wave plates, and the optical path difference of $\{\frac{1}{4}+(\frac{1}{2})\times m\}\times\lambda$ may be generated based on the difference in thickness between the two wave plates. In such a case, the two wave plates may have greater thicknesses compared to when the third optical member is composed of a single wave plate, and therefore the workability thereof can be improved.

An optical device according to a second exemplary embodiment of the present disclosure will now be described with reference to FIG. 9.

Figure 9:
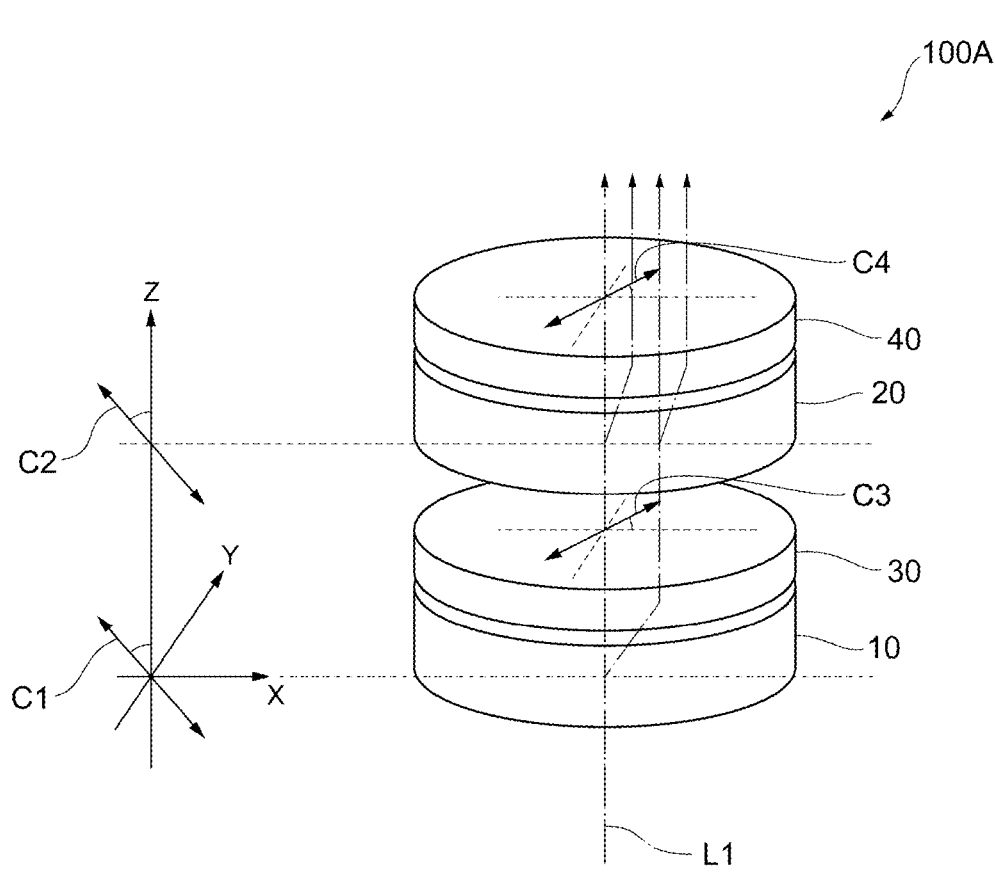
FIG. 9 is a perspective view illustrating an exemplary structure of an optical device according to a second exemplary embodiment of the present disclosure.

FIG. 9 is a perspective view illustrating an exemplary structure of the optical device according to the second embodiment of the present disclosure. In the following description, elements that are the same as those in the above-described embodiment will not be described, and only differences will be described. In particular, description of similar effects obtained by similar structures will not be repeated in each embodiment. An optical device 100A according to the present embodiment includes a quarter wave plate 40 in addition to the components of the optical device 100 according to the above-described first embodiment.

Similar to the quarter wave plate 30, the quarter wave plate 40 has the shape of a flat circular plate of substantially the same size as that of the first optical member 10 and the second optical member 20 in plan view when viewed in the direction of the Z axis. The quarter wave plate 40 has two principal surfaces that are parallel to an XY plane and a thickness in a direction parallel to the Z axis. The quarter wave plate 40 has an optical axis C4 disposed on an XY plane such that the optical axis C4 is at an angle of 45 degrees relative to each of the vibration planes of the four laser beam emitted from the second optical member 20. In other words, similar to the optical axis C3 of the quarter wave plate 30, the optical axis C4 of the quarter wave plate 40 is orthogonal to the direction in which the incident light travels. The quarter wave plate 40 is disposed behind the second optical member 20 so that the four linearly polarized laser beams output from the second optical member 20 are converted into and emitted as circularly polarized laser beams.

Since the optical device 100A according to the present embodiment includes the quarter wave plate 40, the laser beams emitted from the optical device 100A are circularly polarized, and therefore have no plane of polarization. Since the emitted laser beams are not direction-dependent, an object can be uniformly processed when, for example, the emitted laser beams are used a laser processing machine.

Moreover, the angle of the optical axis C4 of the quarter wave plate 40 relative to each of the vibration planes of the four laser beams emitted from the second optical member 20 is not limited to 45 degrees, and can instead be other acute angles. In such a case, the emitted light beams are elliptically polarized, but are less direction-dependent compared to the light beams emitted from the above-described optical device 100. The quarter wave plate 40 can, for example, rotate together with the second optical member 20. The quarter wave plate 40 is an example of a fourth optical member that generates an optical path difference of $\{\frac{1}{4}+n\times(\frac{1}{2})\}\times\lambda$ (where n is an integer) between the polarization components that are orthogonal to each other. However, the structure of the fourth optical member is not limited to this.

Figure 10A:
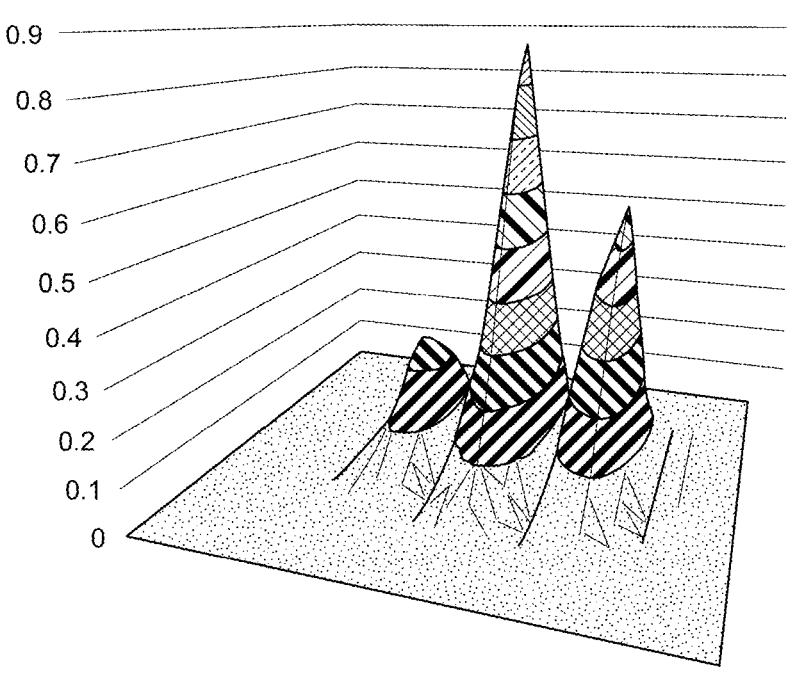
FIG. 10A is a graph showing the result of simulation of the profile of a laser beam incident on the first optical member illustrated in FIG. 1.
Figure 10A:
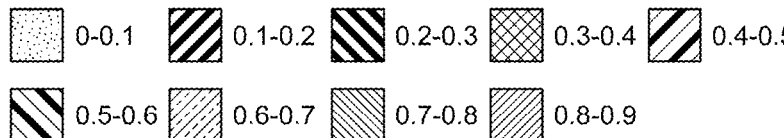
Figure 10B:
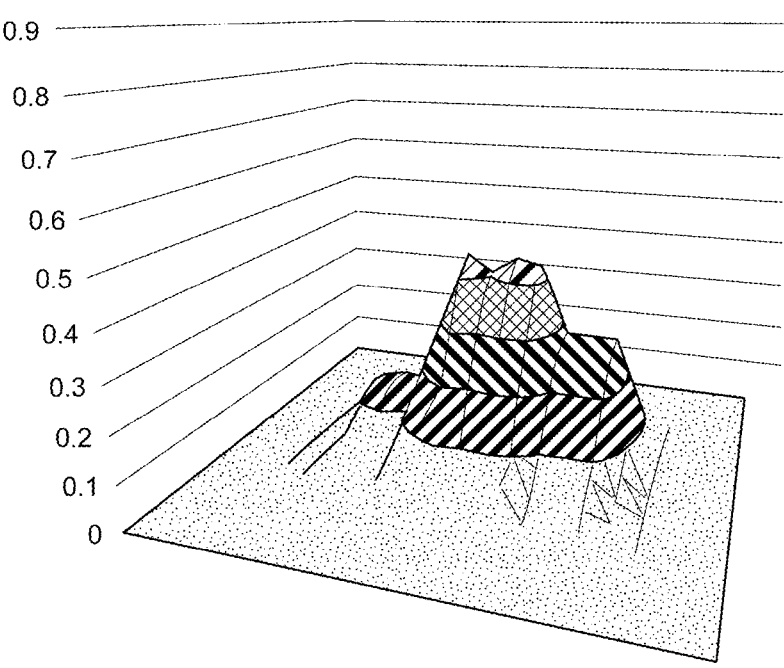
FIG. 10B is a graph showing the result of simulation of the profile of laser beams emitted from the first optical member illustrated in FIG. 1.
Figure 10B:
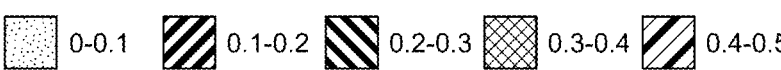
Figure 10C:
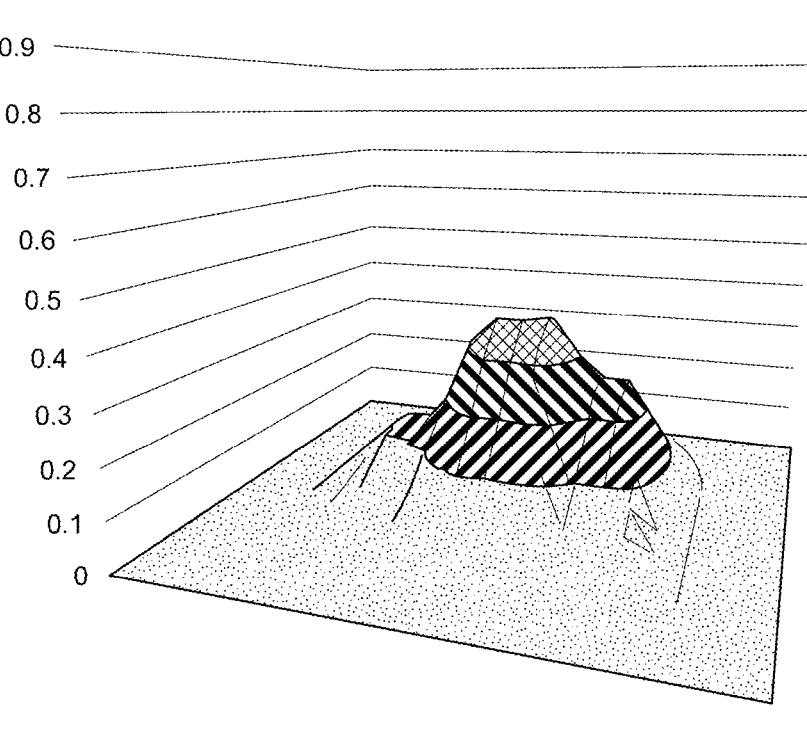
FIG. 10C is a graph showing the result of simulation of the profile of laser beams emitted from the second optical member illustrated in FIG. 1.
Figure 10C:
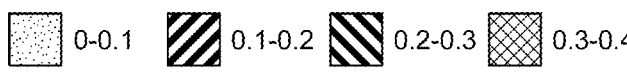

FIG. 10A is a graph showing the result of simulation of the profile of a laser beam incident on the first optical member illustrated in FIG. 1. FIG. 10B is a graph showing the result of simulation of the profile of laser beams emitted from the first optical member illustrated in FIG. 1. FIG. 10C is a graph showing the result of simulation of the profile of laser beams emitted from the second optical member illustrated in FIG. 1. In the graphs of FIGS. 10A to 10C, the bottom plane represents the positions on the laser beams, and the height represents the intensity of the laser beams. The simulations are based on the assumption that the laser diameter is about 2 mm, the separation width of the first optical member 10 is about 0.4 mm, the separation width of the second optical member 20 is about 0.54 mm, and the angle between the direction of separation by the first optical member 10 and the direction of separation by the second optical member 20 is about 68 degrees.

As illustrated in FIG. 10A, the incident light has a trimodal profile with three local peaks. When this laser beam passes through the first optical member 10, the laser beam is divided into two laser beams that partially overlap. Accordingly, as illustrated in FIG. 10B, the laser intensity is made more uniform in one direction so that the three local peaks are eliminated. Then, the laser beams pass through the quarter wave plate 30 and the second optical member 20, so that the laser intensity is made more uniform in another direction, as illustrated in FIG. 10C. Thus, the cross-sectional shape of the laser beam becomes closer to a perfect circle, and a top-hat-shaped profile can be obtained. This simulation result shows that even when the incident light has an uneven intensity distribution, an overall even profile can be obtained by dividing and the incident light into light beams and superimposing the light beams.

Although examples in which the laser beams are converted are described in the above embodiments, light converted by the optical devices 100 and 100A are not limited to laser beams, and may instead be other types of light.

Exemplary embodiments of the present invention have been described above. The above-described embodiments are intended to facilitate understanding of the present invention, and not to limit interpretation of the present invention. The present invention may be modified or improved without departing from the gist thereof, and includes equivalents to the present invention. In other words, the present invention includes the embodiments to which a person skilled in the art has made a design change as appropriate as long as they have characteristics of the present invention. For example, the elements included in the embodiments and arrangements, materials, conditions, shapes, sizes, etc., thereof are not limited to the illustrated examples, and may be changed as appropriate. The elements of the embodiments may be applied in combinations with each other as long as such combinations are technically possible, and the combinations thereof are also included in the scope of the present invention as long as they have characteristics of the present invention.

REFERENCE SIGNS LIST 100, 100A optical device
10 first optical member
20 second optical member
30, 40 quarter wave plate
200 uniaxial crystal
300 quarter wave plate

The invention claimed is:

1. An optical device comprising:
a first single optical member comprising a birefringent material and disposed so that an optical axis of the first optical member is neither parallel nor orthogonal to a direction in which incident light travels, the first optical member of a thickness X;
a second single optical member comprising a birefringent material and disposed so that an optical axis of the second optical member is neither parallel nor orthogonal to the direction in which the incident light travels, the second optical member of the thickness X; and
a third single optical member disposed between the first and second optical members and constructed to generate an optical path difference of $\{\frac{1}{4}+m\times(\frac{1}{2})\}\times\lambda$ between orthogonal polarization components of light emitted from the first optical member, the third optical member of a thickness Y,
wherein the thickness Y is different from thickness X;
wherein $\lambda$ is a wavelength of the incident light and m is an integer,
wherein at least one of the first optical member, the second optical member, or the third optical member is configured to rotate about an axis of the incident light such that the incident light impinges upon the optical device at a first state and at a second state based on the rotation of the at least one of the first optical member, the second optical member, or the third optical member, where the first state is different than the second state, and
wherein the second optical member is configured to rotate at least 180 degrees about the axis of the incident light relative to the first optical member.

2. The optical device according to claim 1, wherein each of the first optical member, the second optical member, and the third optical member comprise synthetic quartz.

3. The optical device according to claim 1, wherein the first optical member and the second optical member are formed of a material having a refractive index greater than a refractive index of synthetic quartz.

4. The optical device according to claim 3, wherein the third optical member is made of synthetic quartz.

5. The optical device according to claim 1, further comprising a fourth optical member constructed to generate an optical path difference of $\{\frac{1}{4}+n\times(\frac{1}{2})\}\times\lambda$ between orthogonal polarization components of light emitted from the second optical member, where n is an integer.

6. The optical device according to claim 1, wherein an angle between the optical axis of the first optical member and the incident light and an angle between the optical axis of the second optical member and the incident light are both between 35 degrees and 55 degrees.

7. The optical device according to claim 1, wherein the third optical member has a thickness in a direction in which the incident light travels that is less than a thickness of the first and second optical members.

8. The optical device according to claim 1, wherein the birefringent material of the first optical member is constructed to divide the incident light to two separate laser beams.

9. The optical device according to claim 8, wherein an optical axis of the third optical member is disposed to be orthogonal to the direction in which the two separate laser beams emitted from the first optical member travel.

10. The optical device according to claim 9, wherein an angle between the optical axis of the third optical member and each vibration plane of the two separate laser beams is 45 degrees.

11. The optical device according to claim 9, wherein the second optical member is constructed to emit four laser beams based on the light emitted from the third optical member.

12. The optical device according to claim 11, wherein the four laser beams are emitted from the second optical member are linearly distributed in a direction perpendicular to a direction in which the incident light travels.

13. The optical device according to claim 9, wherein the third optical member is a quarter wave plate.

14. An optical device comprising:

a first single optical member formed of a material and constructed to have an optical axis that is neither parallel nor orthogonal to a direction in which incident light travels through the optical device, the first single optical member of a thickness X;

a second single optical member formed of a material and constructed to have an optical axis that is neither parallel nor orthogonal to the direction in which the incident light travels, the second single optical member of the thickness X; and a third single optical member disposed between the first and second optical members and constructed to generate an optical path difference of $\{\frac{1}{4}+m\times(\frac{1}{2})\}\times\lambda$ between orthogonal polarization components of light emitted from the first optical member, the third single optical member of a thickness Y;

wherein the thickness Y is different from thickness X;

wherein $\lambda$ is a wavelength of the incident light and m is an integer, and wherein at least one of the first optical member, the second optical member, or the third optical member is configured to rotate about an axis of the incident light such that the incident light impinges upon the optical device at a first state and at a second state based on the rotation of the at least one of the first optical member, the second optical member, or the third optical member, where the first state is different than the second state.

15. The optical device according to claim 14, wherein the second optical member is configured to rotate at least 180 degrees about the axis of the incident light relative to the first optical member.

16. The optical device according to claim 14, wherein each of the first optical member, the second optical member, and the third optical member comprise synthetic quartz.

17. The optical device according to claim 14, wherein the first optical member and the second optical member are formed of a material having a refractive index greater than a refractive index of synthetic quartz, and wherein the third optical member is made of synthetic quartz.

18. The optical device according to claim 14, further comprising a fourth optical member constructed to generate an optical path difference of $\{\frac{1}{4}+n\times(\frac{1}{2})\}\times\lambda$ between orthogonal polarization components of light emitted from the second optical member, where n is an integer.

* * * * *